United States Patent
Beall et al.

(10) Patent No.: US 9,919,953 B2
(45) Date of Patent: Mar. 20, 2018

(54) FUSION FORMABLE LITHIUM ALUMINOSILICATE GLASS CERAMIC

(71) Applicant: Corning Incorporated, Corning, NY (US)

(72) Inventors: George Halsey Beall, Big Flats, NY (US); Heather Debra Boek, Corning, NY (US); Alexandre Michel Mayolet, Corning, NY (US); Mark Owen Weller, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/235,610

(22) Filed: Aug. 12, 2016

(65) Prior Publication Data

US 2016/0347651 A1    Dec. 1, 2016

Related U.S. Application Data

(62) Division of application No. 14/185,202, filed on Feb. 20, 2014, now Pat. No. 9,440,878.

(60) Provisional application No. 61/770,376, filed on Feb. 28, 2013.

(51) Int. Cl.

| | |
|---|---|
| *C03C 3/083* | (2006.01) |
| *C03C 3/085* | (2006.01) |
| *C03C 10/12* | (2006.01) |
| *C03C 10/00* | (2006.01) |
| *C03B 17/06* | (2006.01) |

(52) U.S. Cl.
CPC ........ *C03C 10/0027* (2013.01); *C03B 17/064* (2013.01); *C03B 17/067* (2013.01); *C03C 10/00* (2013.01); *C03C 10/0009* (2013.01); *C03C 10/0018* (2013.01)

(58) Field of Classification Search
CPC ..... C03C 3/083; C03C 3/085; C03C 10/0027; C03C 10/0009
See application file for complete search history.

(56) References Cited

U.S. PATENT DOCUMENTS

| | | |
|---|---|---|
| 3,006,775 A | 10/1961 | Chen |
| 5,691,256 A | 11/1997 | Taguchi et al. |
| 6,270,876 B1 | 8/2001 | Abe et al. |
| 6,284,340 B1 | 9/2001 | Abe et al. |
| 6,426,311 B1 | 7/2002 | Goto et al. |
| 7,116,888 B1 | 10/2006 | Aitken et al. |
| 7,589,038 B2 | 9/2009 | Goto et al. |
| 8,071,493 B2 | 12/2011 | Yagi |
| 8,093,167 B2 | 1/2012 | Yagi et al. |
| 8,114,795 B2 | 2/2012 | Yagi et al. |
| 8,309,480 B2 | 11/2012 | Fujisawa et al. |
| 8,787,980 B2 | 7/2014 | Hashimoto et al. |
| 2004/0197575 A1 | 10/2004 | Bocko et al. |
| 2008/0020919 A1 | 1/2008 | Murata |
| 2009/0118113 A1 | 5/2009 | Yagi |
| 2009/0162608 A1 | 6/2009 | Yagi et al. |
| 2011/0014475 A1 | 1/2011 | Murata |
| 2011/0136651 A1 | 6/2011 | Yagi et al. |
| 2012/0135848 A1 | 5/2012 | Beall et al. |
| 2012/0309607 A1 | 12/2012 | Durschang et al. |
| 2013/0288876 A1 | 10/2013 | Fujisawa et al. |
| 2014/0238078 A1 | 8/2014 | Boek et al. |
| 2015/0251383 A1 | 9/2015 | Beall et al. |
| 2015/0251949 A1 | 9/2015 | Boek et al. |

FOREIGN PATENT DOCUMENTS

| | | |
|---|---|---|
| CN | 101233086 A | 7/2008 |
| EP | 2075237 | 7/2009 |
| JP | 09035234 A | 2/1997 |
| JP | 2001019479 | 1/2001 |
| JP | 2001126236 A | 5/2001 |
| WO | 2010002477 | 1/2010 |
| WO | 2012147615 | 11/2012 |
| WO | 2012151434 | 11/2012 |
| WO | 2014055840 | 4/2014 |

OTHER PUBLICATIONS

English Translation of CN201480011255.6 First Office Action dated Jan. 4, 2017, China Patent Office.
English Translation of JP2015560263 Office Action Dated Jan. 9, 2018, Japan Patent Office, 2 Pgs.

*Primary Examiner* — Karl Group
(74) *Attorney, Agent, or Firm* — Kevin M. Johnson

(57) ABSTRACT

A down-drawable glass ceramic. The glass ceramic has a composition which yields a liquidus viscosity that enables formation of the parent glass by down-draw techniques such as fusion-draw and slot-draw methods. The resulting glass ceramic is white or translucent in appearance with high strength achieved through heat treatment of the fusion-formed glass.

18 Claims, No Drawings

FUSION FORMABLE LITHIUM ALUMINOSILICATE GLASS CERAMIC

This application is a divisional of U.S. patent application Ser. No. 14/185,202 filed on Feb. 20, 2014, now U.S. Pat. No. 9,440,878, which also claims the benefit of priority under 35 U.S.C. § 119 of U.S. Provisional Application 61/770,376 filed on Feb. 28, 2013, the content of which is relied upon and incorporated herein by reference in its entirety.

BACKGROUND

The disclosure relates to glass ceramic. More particularly, the disclosure relates to glass ceramics that are formable by down-draw processes. Even more particularly, the disclosure relates to fusion-formable glass ceramics.

Lithium disilicate glass ceramics are frequently used in applications where high strength and fracture toughness are desirable. Down-draw techniques, such as down-drawing and fusion-drawing, are capable of producing thin sheets of glass. Such methods, however, require that the glass or glass ceramic have sufficient viscosity at the liquidus temperature (liquidus viscosity) to be formed by these processes.

SUMMARY

A down-drawable glass ceramic is provided. The glass ceramic has a composition which yields a liquidus viscosity that enables formation of the parent glass by down-draw techniques such as fusion-draw and slot-draw methods. The resulting glass ceramic is white or translucent in appearance with high strength achieved through heat treatment of the fusion-formed glass.

Accordingly, one aspect of the disclosure is to provide a glass ceramic comprising a lithium silicate crystallized component and a lithium aluminum silicate crystallized component; and a residual glass component. The residual glass component comprises an alkali aluminosilicate glass that includes at least one of sodium and potassium. The glass ceramic has a composition located within an area defined by a ternary eutectic of β-spodumene-lithium disilicate-tridymite in the $SiO_2$—$Al_2O_3$—$Li_2O$ system and a binary eutectic of orthoclase-tridymite in the $SiO_2$—$Al_2O_3$—$K_2O$ system, and wherein the ternary eutectic and binary eutectic occur at temperatures of less than about 1000° C.

A second aspect of the disclosure is to provide a cerammable glass comprising from about 72 wt % to about 85 wt % $SiO_2$, from about 7.0 wt % to about 11 wt % $Al_2O_3$, from about 4.3 wt % to about 6.5 wt % $Li_2O$, and from about 4 wt % to about 9 wt % $K_2O$, wherein the glass has a liquidus viscosity of at least about 100 kP.

A third aspect of the disclosure is to provide a method of making a glass ceramic. The method comprises down-drawing a glass comprising from about 72 wt % to about 85 wt % $SiO_2$, from about 7.0 wt % to about 11 wt % $Al_2O_3$, from about 4.3 wt % to about 6.5 wt % $Li_2O$, and from about 4 wt % to about 9 wt % $K_2O$, wherein the glass has a liquidus viscosity of at least about 100 kP; and heating the glass to form the glass ceramic. Heating the glass to form the glass ceramic includes crystallizing a lithium silicate component and a lithium aluminosilicate component. The glass ceramic also includes a residual glass component comprising an alkali aluminosilicate glass that comprises at least one of sodium and potassium.

These and other aspects, advantages, and salient features will become apparent from the following detailed description and the appended claims.

DETAILED DESCRIPTION

In the following description, it is understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification can be used in any and all combinations.

As used herein, the term "glass ceramic" refers to polycrystalline materials formed by a controlled crystallization of a precursor glass. Glass ceramics typically comprise at least one crystalline phase and at least one glass phase. In general, the method for producing such glass ceramics customarily involves three fundamental steps: first, melting a glass-forming batch containing the selected metallic oxides; second, cooling the melt to a temperature at least below its transformation range, while simultaneously forming a glass body of a desired geometry; and third, heating the glass body to a temperature above the transformation range of the glass in a controlled manner to generate crystals in situ. To develop nuclei in the glass, the glass will be heated initially to a temperature within or somewhat above the transformation range for a period of time; although there are certain compositions that are known to be self-nucleating and thus do not require the development of nuclei. Thereafter, the temperature will be raised to temperatures where crystals can grow from the nuclei. The resulting crystals are typically uniformly distributed and fine-grained. Internal nucleation permits glass ceramics to have favorable qualities such as a very narrow distribution of particle size and a highly uniform dispersion of crystals throughout the glass host.

Although the fusion-draw method of forming glass is generally described herein, it is understood that the following description is equally applicable to other down-draw methods of forming glass such as, for example, slot-draw methods.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Lithium disilicate glass ceramics are commonly used for dental and other applications, primarily due to their high strength and fracture toughness. Such glass ceramics lack a sufficiently high liquidus viscosity to be allow direct formation by the fusion process, as the process requires a much higher viscosity at the liquidus than that available in the precursor glasses of glass ceramics. Depending upon particular compositions and the forming parameters implemented, the fusion process requires viscosities at the liquidus of at least 75,000 poise, in some cases, of well over 100,000 poises, and more typically above 500,000 poises. The parent glasses of glass ceramics, which are designed to easily crystallize, typically have viscosities at their liquid of 10,000 poise or below, and never above 20,000 poise, and are therefore are not amenable to fusion forming.

One method of forming such glass ceramics is to fusion-form a glass, ion exchanging the glass in a lithium-containing salt bath to exchange lithium for sodium in the glass, and then ceramming the glass to form the glass ceramic. This process requires a high temperature bath, is complex, and expensive.

Described herein is a glass ceramic composition which, in some embodiments, has a liquidus viscosity of at least about 100 kilopoise (kpoise), in some embodiments, at least 120 kpoise, and, in other embodiments, at least about 150 kpoise. The high liquidus viscosity makes the "parent" glass (i.e., the glass from which the glass ceramic is ultimately formed) formable by down-draw methods such as slot-draw, fusion-draw, or the like. In some embodiments, the parent glass is formed by fusion-draw methods. The glass ceramics described herein are formed by first down-drawing the parent glass, which is then converted to a glass ceramic by reheating or "ceramming."

The fusion-draw process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank. These outside surfaces extend down and inwardly so that they join at an edge below the drawing tank. The two flowing glass surfaces join at this edge to fuse and form a single flowing sheet. The fusion draw method offers the advantage that, since the two glass films flowing over the channel fuse together, neither outside surface of the resulting glass sheet comes in contact with any part of the apparatus. Thus, the surface properties are not affected by such contact.

The slot-draw method is distinct from the fusion-draw method. Here, the molten raw material glass is provided to a drawing tank having an open slot with a nozzle that extends the length of the slot at the bottom of the drawing tank. The molten glass flows through the slot/nozzle and is drawn downward as a continuous sheet therethrough and into an annealing region. Compared to the fusion-draw process, the slot-draw process provides a thinner sheet, as only a single sheet is drawn through the slot, rather than two sheets being fused together, as in the fusion down-draw process.

The glass ceramic comprises a crystalline lithium silicate component or phase, a crystalline lithium aluminum silicate component or phase, and a stiff residual glass component. The residual glass component comprises an alkali aluminosilicate glass which comprises at least one of sodium and potassium. The residual glass component, in some embodiments, comprises at least about 20 wt % of the glass ceramic, but is stiff enough to prevent undesired deformation upon crystallization of the resulting article such as, for example, a sheet. The glass ceramic has a white or translucent appearance with good strength, which is achieved through direct heat treatment of the fusion-formed glass.

In order to provide the parent glass with a sufficiently high viscosity and low liquidus temperature, the glass ceramic composition, in some embodiments, is located within an area defined by a ternary eutectic of β-spodumene-lithium disilicate-tridymite in the $SiO_2$—$Al_2O_3$—$Li_2O$ system and a binary eutectic of orthoclase-tridymite in the $SiO_2$—$Al_2O_3$—$K_2O$ system, wherein the ternary eutectic and binary eutectic occur at temperatures of less than about 1000° C. Upon heat treatment or "ceramming" of the parent glass, two lithium-containing crystalline phases—lithium disilicates ($Li_2Si_2O_3$) and a β-quartz solid solution—are formed, leaving a viscous glass of quartzfeldspathic composition.

In some embodiments, the glass ceramic composition comprises from about 72 wt % to about 85 wt % $SiO_2$, from about 7 wt % to about 11 wt % $Al_2O_3$, from about 4.3 wt % to about 6.5 wt % $Li_2O$, and from about 4 wt % to about 9 wt % $K_2O$. In certain embodiments, at least a portion of $K_2O$ in the glass ceramic may be replaced by an equivalent number of moles of $Na_2O$. In some embodiments, $Na_2O$ replaces up to about 75% of the $K_2O$ present in the glass ceramic on a molar basis. In some embodiments, the cerammable glass may further comprise at least one of BaO and ZnO. In some embodiments, a portion of $K_2O$ in the glass ceramic may be replaced by an equivalent number of moles of BaO. In certain embodiments, about 3.2 wt % $K_2O$ may be replaced by about 5 wt % BaO. In some embodiments, $Al_2O_3$ in the glass ceramic may be replaced by an equivalent number of moles of ZnO. In certain embodiments, about 3.8 wt % $Al_2O_3$ may be replaced by about 3.0 wt % ZnO. Phosphorus pentoxide ($P_2O_5$) may be added as a nucleating agent. Accordingly, the glass ceramic composition, in some embodiments, may further comprise from about 0.1 wt % to about 5.0 wt % $P_2O_5$. Noble metals (i.e., Ag, Au, Pt, Pd, and Rh) may also serve as nucleating agents. In other embodiments, either zirconia ($ZrO_2$) or titania ($TiO_2$) may be used as nucleating agents. In such embodiments, the glass ceramic composition may include up to about 1.5 wt % $ZrO_2$ and/or up to about 3 wt % $TiO_2$. The glass ceramic composition may therefore, in some embodiments, further include from about 0.0001 wt % to about 0.1 wt % of at least one noble metal. When silver is included in the glass ceramic, photosensitizers such as $CeO_2$ or the like, along with $SnO_2$ and $Sb_2O_3$ are also added to the composition. These metals generally impart a grey or brown tint to the resulting glass ceramic, and each of $CeO_2$, $SnO_2$, and $Sb_2O_3$ may be present in a range from about 0.005 wt % to about 0.5 wt %. In some embodiments, the glass ceramic may be substantially free of or contain 0 wt % $TiO_2$ and/or $ZrO_2$.

A cerammable parent glass is also provided. The cerammable glass comprises from about 72 wt % to about 83 wt % $SiO_2$, from about 8 wt % to about 11 wt % $Al_2O_3$, from about 4.3 wt % to about 5.8 wt % $Li_2O$, and from about 4 wt % to about 9 wt % $K_2O$. The cerammable glass has a liquidus viscosity of at least about 100 kpoise and, in some embodiments, the glass has a liquidus viscosity of at least about 150 kpoise.

In certain embodiments, at least a portion of $K_2O$ in the cerammable glass may be replaced by an equivalent number of moles of $Na_2O$. In some embodiments, $Na_2O$ replaces up to about 75% of the $K_2O$ present in the cerammable glass on a molar basis. In some embodiments, the cerammable glass may further comprise at least one of BaO and ZnO. In some embodiments, a portion of $K_2O$ in the glass ceramic may be replaced by an equivalent number of moles of BaO. In certain embodiments, about 3.2 wt % $K_2O$ may be replaced by about 5 wt % BaO. In some embodiments, $Al_2O_3$ in the glass ceramic may be replaced by an equivalent number of moles of ZnO. In certain embodiments, about 3.8 wt % $Al_2O_3$ may be replaced by about 3.0 wt % ZnO. In some embodiments, the cerammable glass may further comprise from about 0.1 wt % to about 5.0 wt % $P_2O_5$. In some embodiments, the cerammable glass further comprises from about 0.0001 wt % to about 0.1 wt % of at least one noble metal (i.e., Ag, Au, Pt, and/or Pd).

A method of making the glass ceramics described herein is also provided. The glass ceramics comprise a crystalline lithium silicate component or phase, a crystalline lithium aluminum silicate component or phase, and a residual glass component that comprises an alkali aluminosilicate glass comprising at least one of sodium and potassium. The method comprises down-drawing the parent glass. In some embodiments, the method comprises fusion-forming or fusion-drawing a parent glass and, in other embodiments, the method comprises slot-drawing the parent glass. The parent glass comprises from about 72 wt % to about 85 wt % $SiO_2$, from about 7 wt % to about 11 wt % $Al_2O_3$, from about 4.3 wt % to about 6.5 wt % $Li_2O$, and from about 4 wt % to about 9 wt % $K_2O$. The parent glass has a liquidus viscosity of at least about 100 kpoise and, in some embodiments, at least about 150 kpoise. The fusion-formed parent glass is then heated to form the glass ceramic. In the heating step, the glass ceramic is formed as both the lithium silicate component and the aluminosilicate component are crystallized, and the residual alkali aluminosilicate glass component is formed.

The heat treatment required for crystallization is flexible, but the maximum temperature should not exceed 900° C. Accordingly, the step of heating the glass to form the glass ceramic, in some embodiments, includes heating the fusion-formed or down-drawn glass at a temperature in a range from about 600° C. to about 900° C. The heat treatment may, in some embodiments, include a 2-hour hold at 600° C. followed by a 4-hour hold at 800° C. and then cooling to room temperature at the furnace rate (i.e., the rate of cooling of the furnace when the power is cut off). Furnace rates before and between holds are typically 300° C./hr, although slower and faster rates (at least up to 500° C./hr) are satisfactory. Shorter heat treatments at 800° C. for less than an hour are also feasible.

The down-drawn and fusion-formed glasses and glass ceramics described herein allow thin sheets and laminates to be formed by the fusion process, which in turn provides properties that are not easily produced in down-drawn and/or fusion-formed glass, namely opacity, translucency, achievement of pastel colors, resistance to abrasion, and high fracture toughness. In addition, direct forming of glass ceramics by down-drawing and/or fusion is less complex and presumably less expensive than those made by other methods known in the art.

EXAMPLES

The following examples illustrate the features and advantages of the glass ceramics, the cerammable parent glass, and the method of making the glass ceramic, and are in no way intended to limit the disclosure or appended claims thereto.

Example 1

A glass ceramic was made from a parent glass having the composition 79.5 wt % $SiO_2$, 9.2 wt % $Al_2O_3$, 5.3 wt % $Li_2O$, 6.0 wt % $K_2O$, and 0.5 wt % $P_2O_5$. This glass has a measured annealing temperature of 524° C. and a strain point of 480° C. The liquidus temperature was 950° C. and the viscosity at this point was 410,000 poise, or 410 kpoise. This glass was first heat treated for 2 hours at 650° C. The temperature was then raised to 850° C. and held at temperature for 4 hours to produce a glass ceramic comprising lithium disilicate, β-quartz solid solution, and a residual glass of potassium aluminosilicate of general quartzofeldspathic composition. This residual glass was sufficiently stiff to prevent deformation of the article during the crystallization process.

Example 2

A glass ceramic was made from a parent glass having the composition 72.5 wt % $SiO_2$, 8.2 wt % $Al_2O_3$, 4.3 wt % $Li_2O$, 2.6 wt % $Na_2O$, 5.2 wt % $K_2O$, 6.2 wt % BaO, 0.3 wt % ZnO, 0.03 wt % $CeO_2$, 0.5 wt % $Sb_2O_3$, 0.1 wt % Ag, and 0.00042 wt % Au. This glass has a measured annealing temperature of 488° C. and a strain point of 446° C. The liquidus temperature was 850° C. and the viscosity at this point was 446,000 poises (446 kpoise). The glass was first heat treated for 30 minutes at 560° C. The temperature was then raised to 600° C. and the glass was held at that temperature for 1 hour. The temperature was then raised to 850° C. and the glass was held at that temperature for 2 hours to produce a glass ceramic composed of lithium disilicate, β-quartz solid solution, and a residual glass of alkali aluminosilicate of general quartzofeldspathic composition. This residual glass was sufficiently stiff to prevent deformation of the article during the crystallization process.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass, the glass being cerammable and comprising from about 72 wt % to about 85 wt % $SiO_2$, from about 7 wt % to about 11 wt % $Al_2O_3$, from about 4.3 wt % to about 6.5 wt % $Li_2O$, and from about 4 wt % to about 9 wt % $K_2O$, wherein the glass has a composition located within an area defined by a ternary eutectic of β-spodumene-lithium disilicate-tridymite in the $SiO_2$—$Al_2O_3$—$Li_2O$ system and a binary eutectic of orthoclase-tridymite in the $SiO_2$—$Al_2O_3$—$K_2O$ system, and wherein the ternary eutectic and binary eutectic occur at temperatures of less than about 1000° C., wherein the glass has a liquidus viscosity of at least about 100 kP, and wherein the glass comprises 0 wt % of at least one of $TiO_2$ and $ZrO_2$.

2. The glass of claim 1, further comprising up to 2.6 wt % $Na_2O$.

3. The glass of claim 1, further comprising up to about 5 wt % BaO.

4. The glass of claim 1, further comprising up to about 3.0 wt % ZnO.

5. The glass of claim 1, further comprising from about OA wt % to about 5.0 wt % $P_2O_5$.

6. A glass, the glass being cerammable and comprising from about 72 wt % to about 85 wt % $SiO_2$, from about 7 wt % to about 11 wt % $Al_2O_3$, from about 4.3 wt % to about 6.5 wt % $Li_2O$, from about 4 wt % to about 9 wt % $K_2O$, and 0.0001 wt % to about 0.1 wt % of at least one noble metal, wherein the glass has a composition located within an area defined by a ternary eutectic of β-spodumene-lithium disilicate-tridymite in the $SiO_2$—$Al_2O_3$—$Li_2O$ system and a binary eutectic of orthoclase-tridymite in the $SiO_2$—$Al_2O_3$—$K_2O$ system, and wherein the ternary eutectic and binary eutectic occur at temperatures of less than about 1000° C., and the glass has a liquidus viscosity of at least about 100 kP.

7. The glass of claim 6, wherein the at least one noble metal comprises silver.

8. The glass of claim 1, wherein the glass has a liquidus viscosity of at least about 120 kpoise.

9. The glass of claim 8, wherein the glass has a liquidus viscosity of at least about 150 kpoise.

10. The glass of claim 6, further comprising up to 2.6 wt % $Na_2O$.

11. The glass of claim 6, further comprising up to about 5 wt % BaO.

12. The glass of claim 6, further comprising up to about 3.0 wt % ZnO.

13. The glass of claim 6, further comprising from about 0.1 wt % to about 5.0 wt % $P_2O_5$.

14. The glass of claim 6, wherein the at least one noble metal comprises Ag, Au, Pt, Pd, or Rh.

15. The glass of claim 6, wherein the glass has a liquidus viscosity of at least about 120 kpoise.

16. The glass of claim 15, wherein the glass has a liquidus viscosity of at least about 150 kpoise.

17. A glass, the glass being cerammable and comprising from about 72 wt % to about 85 wt % $SiO_2$, from about 7 wt % to about 11 wt % $Al_2O_3$, from about 4.3 wt % to about 6.5 wt % $Li_2O$, and from about 4 wt % to about 9 wt % $K_2O$, wherein the glass has a composition located within an area defined by a ternary eutectic of β-spodumene-lithium disilicate-tridymite in the $SiO_2$—$Al_2O_3$—$Li_2O$ system and a binary eutectic of orthoclase-tridymite in the $SiO_2$—$Al_2O_3$—$K_2O$ system, and wherein the ternary eutectic and binary eutectic occur at temperatures of less than about 1000° C., wherein the glass has a liquidus viscosity of at least about 100 kP, and wherein the glass further comprises $Na_2O$.

18. The glass of claim 7, wherein the glass further comprises at least one of 0.005 wt % to about 0.5 wt % $CeO_2$, 0.005 wt % to about 0.5 wt % $SnO_2$, and 0.005 wt % to about 0.5 wt % $Sb_2O_3$.

* * * * *

UNITED STATES PATENT AND TRADEMARK OFFICE
CERTIFICATE OF CORRECTION

PATENT NO. : 9,919,953 B2
APPLICATION NO. : 15/235610
DATED : March 20, 2018
INVENTOR(S) : George Halsey Beall et al.

It is certified that error appears in the above-identified patent and that said Letters Patent is hereby corrected as shown below:

In the Claims

In Column 6, Line 60, Claim 5, delete "OA" and insert -- 0.1 --, therefor.

Signed and Sealed this
Twelfth Day of May, 2020

Andrei Iancu
*Director of the United States Patent and Trademark Office*